April 12, 1960  J. C. JANSEN  2,932,061
METHOD AND APPARATUS FOR PRODUCING SEAMLESS CAPSULES
Filed June 17, 1957
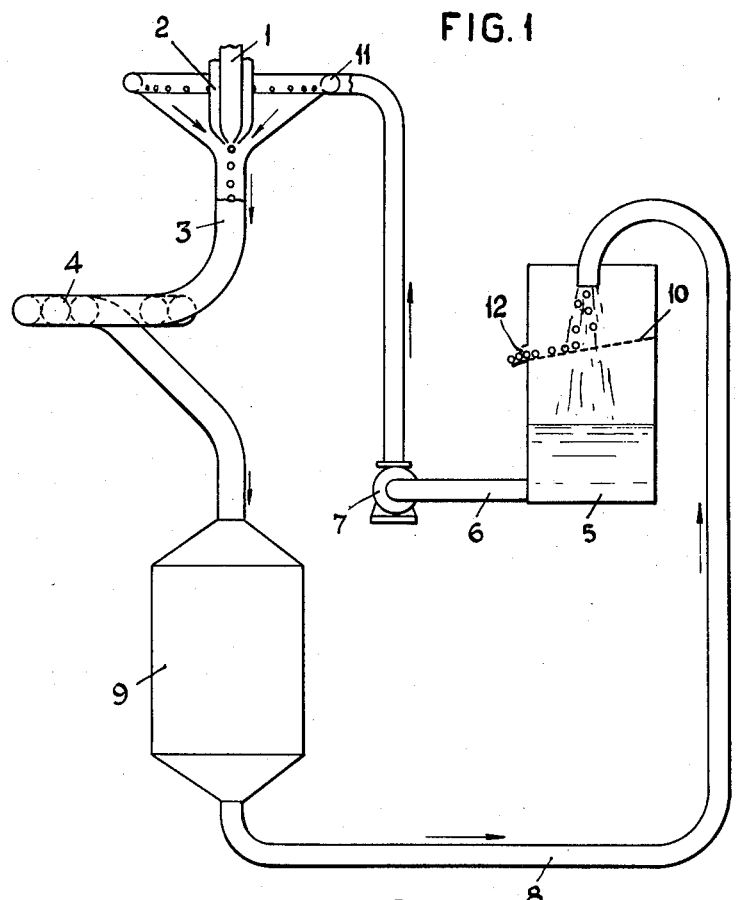
FIG.1
FIG.2
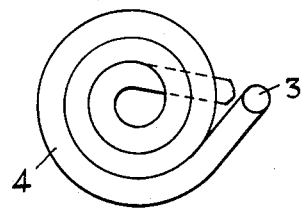
INVENTOR.
Jan Christoffel Jansen
BY
Attorneys

United States Patent Office 2,932,061
Patented Apr. 12, 1960

2,932,061

METHOD AND APPARATUS FOR PRODUCING SEAMLESS CAPSULES

Jan Christoffel Jansen, Nieuw-Loosdrecht, Netherlands, assignor to Globex International Limited, a corporation of Great Britain Application June 17, 1957, Serial No. 666,051

Claims priority, application Netherlands June 20, 1956

6 Claims. (Cl. 18—1)

This invention relates to improvements in the manufacture of seamless filled capsules.

It is known to produce seamless capsules by letting flow filler material and wall material simultaneously from two concentrically situated nozzles into a cooling liquid. From both flows drops are formed consisting of a core of filler material surrounded by an envelope of wall material which hardens in the cooling liquid.

If the temperature and the kind of cooling liquid are chosen well, regularly shaped, substantially spherical capsules can be obtained with a nearly uniform wall thickness. Probably the forming of the capsules is affected by the interfacial tension between cooling fluid and wall material and between filler material and wall material and the rate of congealing too has some importance.

If the interfacial tensions are sufficiently high and if the rate of congealing is chosen well, the difference in specific gravity of wall material and filler material does not influence the final shape of the capsule.

However, cases may occur in which the above mentioned conditions cannot be completely fullfilled, so that for example the interfacial tension between filler material and wall material no longer has the right value. This might be the case if the viscosity of the filler material has an abnormal value or the filler material has an abnormal specific gravity and in general if the viscosity of the encapsulating material deviates for some reason or other from the prescribed value. Consequently the desired quality of the capsules cannot be obtained any more, i.e. a capsule having uniformly shaped and uniformly situated surfaces delimiting the filler material and the wall material. This shape will be referred to as centric in the following part of the specification.

The main object of the invention is a method and apparatus to produce well shaped capsules even under unfavourable circumstances. This is accomplished by forcing the capsules to move in the cooling medium along a wall of which the curvature changes continuously, thereby causing the capsules to roll along the wall rotating about an axis which continuously changes its position relative to the body of the capsule. In order to prescribe the motion of the droplets in an exact manner, the single axis of rotation continuously changing its position may be advantageously substituted by two axes, the one pointing into a direction perpendicular to the direction of motion of the droplets in the cooling liquid, the other axis pointing into the direction of this motion, both these axes of rotation forming part of a plane parallel to the plane of tangents in the point of contact between the droplet and the solid wall along which it is rolling.

This wall can e.g. be an inclining wall located in the cooling medium the slope of said wall from place to place changing two mutually perpendicular directions. The formed capsules can roll down freely along this wall.

Another object of the invention is to force the capsules immediately after being formed by means of a current of cooling liquid to move through a tube with a number of bends. The axis of the tube could be a flat curve as well as a space curve in that case. Very favourable results have been obtained with a tube comprising a portion wound in the shape of a spiral.

In a similar tube the capsule is forced, by the continuously changing angular velocity in combination with the gravity, to rotate about an axis changing its position with respect to the body of the capsules again and again.

It is desirable to design the biggest and the smallest radius of the spiral windings so as to suit the travelling speed of the capsules in the tube. From the centrifugal force the force in the direction of the normal on the wall can be calculated, as well as the pressure exerted by the contents of the capsule on the still plastic material and there must be seen to it that this pressure has reasonable values.

The tube may consist of plastic, especially methacrylic esters.

In the drawing an embodiment of the invention is illustrated.

Figure 1 is a general schematic view of the embodiment.

Figure 2 illustrates a detail of the means used to improve the shape of the capsules.

1 is a conduit through which filler substance is fed from a container (not shown). The encapsulating material, for instance molten gelatin is fed from a container (not shown) through conduit 2, which concentrically surrounds conduit 1, thus forming a nozzle from which the combined streams of filler material and encapsulating material flow either as separate drops consisting of a core of filter material and a jacket of encapsulating material or as a continuous stream which at some distance from the nozzle under the influence of natural or artificial forces, or a combination thereof disintegrates into separate drops. These drops are cooled in a cooling liquid having a specific gravity slightly less than that of the combined drops so that these drops can sink down in the container of the cooling medium, from which they are removed either continuously or intermittently as is well known in the art. In the embodiment of the invention illustrated in Fig. 1, the drops emerging from the nozzle are fed into the enlarged opening of a conduit 3, comprising a spirally wound portion 4 and connected with a conduit 9 of increased diameter, that is to be considered as a container of cooling liquid wherein the drops solidify. At the lower end of container 9 a further conduit 8 is connected, the end of which is bent downwards and has a discharge opening facing the second container 5. In the container 5 an inclined sieve is located and at the lower part of said sieve the container is provided with an opening 12 large enough for the capsules to pass through.

The container 5 is provided with a conduit 6 in which a pump 7 is inserted. Said conduit is connected with a ring shaped conduit 11 provided with openings facing the enlarged end of the conduit 3.

When the apparatus is operated the drops emerging from the nozzle are fed into the upper end of the conduit 3. Cooling medium is continuously pumped by pump 7 through conduit 6 from container 5 to ring shaped conduit 11 from where it flows in the enlarged opening of conduit 3 and hence through the spirally wound portion 4 of said conduit to the container 9. Due to the large diameter of said container the velocity of the cooling liquid is slowed down and the capsules may solidify further. As the pump works continuously the cooling liquid passes through conduit 8 thereby carrying along the capsules. The capsules leaving the opening of the conduit facing the container 5 fall on the sieve 10 and are continuously removed through an opening in the wall of the container at the lower part of the sieve 10. During their passage through the spirally wound part 4 of the conduit 3 the shape of the capsules becomes centric.

It will be clear that the rate of flow of the cooling liquid depends on the difference between the level of the liquid in the conduit 3 and the level of the discharge opening of conduit 8.

While the invention has been described in detail with respect to a preferred form thereof, it is not desired to be limited thereto since many changes and modifications may be made therein without departing from the spirit and scope of the invention.

What is desired to claim is:

1. In an apparatus for manufacturing seamless spherical liquid-filled capsules comprising nozzle means for extruding uncongealed liquid-filled droplets composed of a core of liquid filler material and a jacket of congealable capsule shell-forming material, means for passing said liquid-filled droplets through a conduit filled with a cooling liquid to congeal the capsule shell-forming material, and means for discharging the congealed droplets from said conduit, said conduit including a portion having a curved inside surface, the curvature of which changes continuously in two mutually perpendicular planes.

2. In an apparatus for manufacturing seamless spherical liquid-filled capsules comprising nozzle means for extruding uncongealed liquid-filled droplets composed of a core of liquid filler material and a jacket of congealable capsule shell-forming material, means for passing said liquid-filled droplets through a conduit filled with a cooling liquid to congeal the capsule shell-forming material, and means for discharging the congealed droplets from said conduit, said conduit including an involute spiral tubular portion.

3. In a process of producing seamless spherical liquid-filled capsules by extruding a composite flow of liquid filler material surrounded by liquid congealable capsule shell-forming material, dividing said composite flow into uncongealed droplets composed of a core of filler material and a jacket of congealable capsule shell-forming material, and congealing the capsule shell-forming material of said droplets by passing said droplets through a cooling liquid, the step of rotating said droplets simultaneously about two mutually perpendicular axes of rotation, one axis of rotation always pointing through the center of said droplets in a direction perpendicular to the direction of motion of said droplets in the cooling liquid, and the other axis of rotation always pointing through the center of said droplets in the direction of motion of said droplets in the cooling liquid, whereby said droplets become perfectly spherical as the capsule shell-forming material congeals in the cooling liquid.

4. In a process of producing seamless spherical liquid-filled capsules by extruding a composite flow of liquid filler material surrounded by liquid congealable capsule shell-forming material, dividing said composite flow into uncongealed droplets composed of a core of filler material and a jacket of congealable capsule shell-forming material, and congealing the capsule shell-forming material of said droplets by passing said droplets through a cooling liquid, the step of rotating said droplets simultaneously about two mutually perpendicular axes of rotation, one axis of rotation always pointing through the center of said droplets in a direction perpendicular to the direction of motion of said droplets in the cooling liquid, and the other axis of rotation always pointing through the center of said droplets in the direction of motion of said droplets in the cooling liquid, by rolling said droplets along a solid curved wall the curvature of which changes continuously, whereby said droplets become perfectly spherical as the capsule shell-forming material congeals in the cooling liquid.

5. The process of producing seamless spherical liquid filled capsules according to claim 4, wherein said droplets are rolled along a solid curved wall the curvature of which varies continuously in mutually perpendicular planes.

6. In a process of producing seamless spherical liquid-filled capsules by extruding a composite flow of liquid filler material surrounded by liquid congealable capsule shell-forming material, dividing said composite flow into uncongealed droplets composed of a core of filler material and a jacket of congealable capsule shell-forming material, and congealing the capsule shell-forming material of said droplets by passing said droplets through a cooling liquid, the step of rotating said droplets simultaneously about two mutually perpendicular axes of rotation, one axis of rotation always pointing through the center of said droplets in a direction perpendicular to the direction of motion of said droplets in the cooling liquid, and the other axis of rotation always pointing through the center of said droplets in the direction of motion of said droplets in the cooling liquid, by rolling said droplets while being immersed in said cooling liquid along a solid concave, involute spiral wall.

References Cited in the file of this patent

UNITED STATES PATENTS

| | | |
|---|---|---|
| 1,106,087 | DuPont | Aug. 4, 1914 |
| 1,932,499 | Woods | Oct. 31, 1933 |
| 2,332,671 | Sherer | Oct. 26, 1943 |
| 2,702,923 | Plourde | Mar. 1, 1955 |

FOREIGN PATENTS

| | | |
|---|---|---|
| 762,700 | Great Britain | Dec. 5, 1956 |